US012807029B2

(12) United States Patent
Salter et al.

(10) Patent No.: US 12,807,029 B2
(45) Date of Patent: Nov. 24, 2026

(54) SYSTEMS AND METHODS FOR MONITORING AN ELECTRIC VEHICLE CHARGER

(71) Applicant: Ford Global Technologies, LLC, Dearborn, MI (US)

(72) Inventors: Stuart C. Salter, White Lake, MI (US); Peter J. Nikolajevs, Dearborn, MI (US); Ryan O'Gorman, Beverly Hills, MI (US); Annette Lynn Huebner, Highland, MI (US); Joseph Cavicchiolo, South Lyon, MI (US); Kevin Stone, San Diego, CA (US)

( * ) Notice: Subject to any disclaimer, the term of this patent is extended or adjusted under 35 U.S.C. 154(b) by 420 days.

(21) Appl. No.: 18/436,553

(22) Filed: Feb. 8, 2024

(65) Prior Publication Data

US 2025/0256613 A1 Aug. 14, 2025

(51) Int. Cl.

| | |
|---|---|
| ***G06Q 10/0833*** | (2023.01) |
| ***B60L 53/30*** | (2019.01) |
| ***B60L 53/68*** | (2019.01) |
| *B60L 53/31* | (2019.01) |

(52) U.S. Cl.

CPC ............. *B60L 53/68* (2019.02); *B60L 53/305* (2019.02); *G06Q 10/0833* (2013.01); *B60L 53/31* (2019.02)

(58) Field of Classification Search

CPC ........ B60L 53/68; B60L 53/305; B60L 53/31; G06Q 10/0833

See application file for complete search history.

(56) References Cited

U.S. PATENT DOCUMENTS

| | | | | |
|---|---|---|---|---|
| 7,248,059 B1 * | 7/2007 | Ochoco | H04Q 9/00 324/609 |
| 11,119,224 B2 | 9/2021 | Kilburn et al. | |
| 2007/0057779 A1 * | 3/2007 | Battista | H04W 4/029 340/425.5 |
| 2008/0030330 A1 * | 2/2008 | Vock | A61B 5/6833 340/568.1 |

(Continued)

OTHER PUBLICATIONS

Jay Johnson, et.al, Review of Electric Vehicle Charger Cybersecurity Vulnerabilities, Potential Impacts, and Defenses, Energies, https://www.mdpi.com/1996-1073/15/11/3931, May 26, 2022, pp. 1-26.

(Continued)

*Primary Examiner* — Gary Collins

(74) *Attorney, Agent, or Firm* — Emily Campbell; Eversheds Sutherland (US) LLP

(57) ABSTRACT

A system including a detection unit and a processor is disclosed. The detection unit may be configured to measure a level of nonconforming movement associated with the system. The processor may be configured to determine a system installation state from a plurality of system installation states, and identify an optimal movement threshold, from a plurality of movement thresholds associated with the plurality of system installation states, based on the system installation state. The system may further determine that the level of nonconforming movement may be greater than the optimal movement threshold, and perform a predefined action responsive to determining that the level of nonconforming movement may be greater than the optimal movement threshold.

20 Claims, 5 Drawing Sheets

(56) References Cited

U.S. PATENT DOCUMENTS

| | | | | |
|---|---|---|---|---|
| 2009/0322510 | A1* | 12/2009 | Berger | H04W 60/00 340/568.1 |
| 2010/0097208 | A1* | 4/2010 | Rosing | G06Q 10/087 340/572.1 |
| 2013/0321122 | A1* | 12/2013 | Lee | G06Q 10/0833 340/3.1 |
| 2015/0073642 | A1 | 3/2015 | Widmer et al. | |
| 2017/0136894 | A1 | 5/2017 | Ricci | |
| 2017/0318921 | A1* | 11/2017 | Gharabegian | F24S 30/452 |
| 2018/0201145 | A1 | 7/2018 | Yellambalase et al. | |
| 2018/0253956 | A1* | 9/2018 | Nygren | G01H 11/06 |

OTHER PUBLICATIONS

Anuj Sanghvi, et al., Identification and Testing of Electric Vehicle Fast Charger Cybersecurity Mitigations, National Renewable Energy Laboratory (NREL), https://www.nrel.gov/docs/fy22osti/80799.pdf, Nov. 2021, pp. 1-26.

* cited by examiner

SYSTEMS AND METHODS FOR MONITORING AN ELECTRIC VEHICLE CHARGER

FIELD

The present disclosure relates to systems and methods for monitoring an electrical vehicle charger during shipping, pre-installation stage, and post-installation stage.

BACKGROUND

Many equipment or systems require transport from their manufacturing sites or warehouses to their installation sites or destination locations. For example, an electric vehicle charger may be required to be transported from a warehouse to a customer's location or a charging station location for installation. There may be instances of an electric charger encountering an adverse situation during the shipping stage and/or the pre-installation stage, resulting in dents, scratches, etc. on the charger and/or one or more broken charger components.

In such instances, it becomes difficult to ascertain whether the electric charger was shipped in such a state from the warehouse or if the electric charger became broken during the shipping operation and/or the pre-installation stage where the customer may have mishandled the electric charger.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
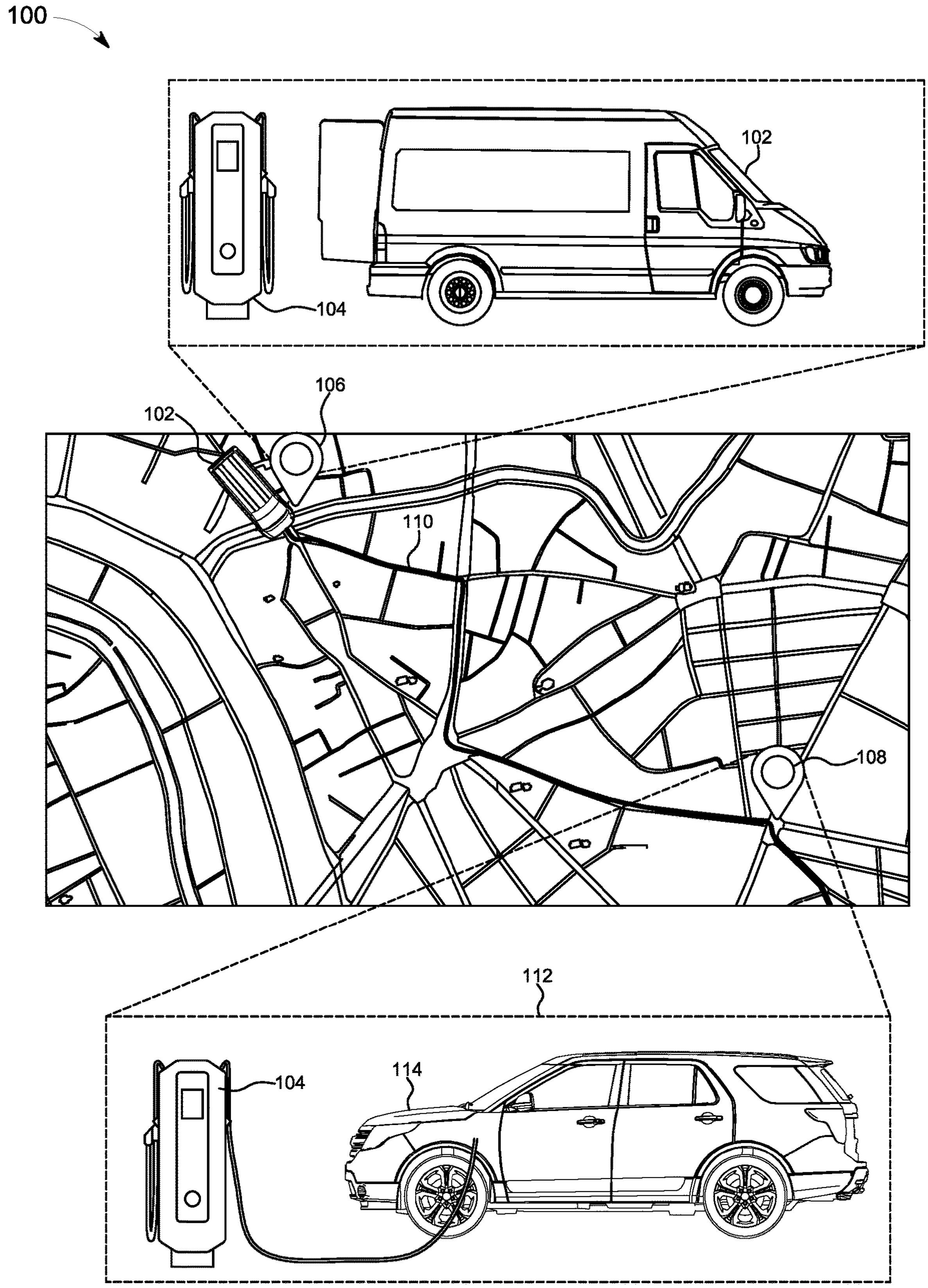
FIG. 1 depicts an example environment in which techniques and structures for providing the systems and methods disclosed herein may be implemented.

The present disclosure describes a system or an electric vehicle charger ("charger") that may be configured to determine details/information associated with an adverse situation that may be encountered by the charger. In some aspects, the charger may encounter an adverse situation when the charger may be getting shipped from a warehouse/source location to a customer/destination location, or when the charger may be at the destination location in a pre-installation state or an installed state. The charger may get dents, scratches, etc., and/or one or more charger components may get broken when the charger encounters an adverse situation. The adverse situation details/information determined by the charger may assist the customer and/or an operator associated with a charger transport/shipping firm, a charger original equipment manufacturer (OEM), and an insurance firm, etc. to determine a potential party responsible for the adverse situation and/or plan remedial actions to prevent similar adverse situations in the future.

In some aspects, the charger may include a detection unit or an accelerometer that may be configured to measure a level of nonconforming or abrupt charger movements, when the charger may be in a transit state (e.g., when the charger may be getting shipped), a pre-installation state, or an installed state. The charger may be further configured to determine an optimal movement threshold associated with the charger that may be considered "normal" or within "permissible limits", based on the charger state in which the charger may be in. For example, the charger may determine a first movement threshold as the optimal movement threshold when the charge state may be the transit state, a second movement threshold as the optimal movement threshold when the charge state may be the pre-installation state, and a third movement threshold as the optimal movement threshold when the charge state may be the installed state.

Responsive to determining the optimal movement threshold, the charger may compare the level of nonconforming movement measured by the accelerometer with the optimal movement threshold to determine whether the charger may have encountered an adverse situation. In some aspects, the charger may determine that the charger may have encountered an adverse situation when the level of nonconforming measured by the accelerometer may be greater than the optimal movement threshold. Responsive to such determination, the charger may perform one or more predefined actions.

For example, responsive to determining that the charger may have encountered an adverse situation, the charger may power its telematics control unit (TCU) and a geolocation unit by using the energy stored in a charger battery (e.g., when the charger may be in the transit state or the pre-installation state, or when the charger may be in the installed state but the utility power supply to the charger may be interrupted). When the geolocation unit may be powered-up, the geolocation unit may determine a charger geolocation where the charger may have encountered the adverse situation. Further, when the TCU may be powered-up, the TCU may transmit details associated with the adverse situation to a server and/or a user device. In an exemplary aspect, the details associated with the adverse situation may include the charger geolocation where the charger may have encountered the adverse situation, information associated with date and time when the charger may have encountered the adverse situation, the level of nonconforming movement measured by the accelerometer, and/or the like. The charger may further store the details described above in a charger memory.

The customer and/or the operator associated with a charger transport/shipping firm, a charger OEM, an insurance firm, etc. may access the server, the user device and/or the charger memory to analyze the details associated with the adverse situation, to ascertain or determine a party potentially responsible for the adverse situation (and plan future remedial actions).

The present disclosure discloses a charger that may determine details associated with an adverse situation that may be encountered by the charger. The charger may determine the details associated with the adverse situation when the charger may be in transit, a pre-installation state or after installation. The details assist a charger customer and/or an operator associated with a charger OEM, and an insurance firm, etc. to conveniently determine a party responsible for the adverse situation and accordingly plan future actions. The charger provides end-to-end monitoring support to the customer and/or the operator, as the charger determines the details associated with the adverse situation right from the charger's shipping state to the post-installation state. These and other advantages of the present disclosure are provided in detail herein.

Illustrative Embodiments

The disclosure will be described more fully hereinafter with reference to the accompanying drawings, in which example embodiments of the disclosure are shown, and not intended to be limiting.

FIG. 1 depicts an example environment 100 in which techniques and structures for providing the systems and methods disclosed herein may be implemented. The environment 100 may include a vehicle 102 that may be configured to transport a system 104 from a source location 106 to a destination location 108 through a road network 110. The vehicle 102 may take the form of any commercial vehicle such as, for example, a car, a work vehicle, a crossover vehicle, a truck, a van, a minivan, etc. Further, the vehicle 102 may be a manually driven vehicle and/or may be configured to operate in a fully autonomous (e.g., driverless) mode or a partially autonomous mode and may include any powertrain such as, for example, a gasoline engine, one or more electrically-actuated motor(s), a hybrid system, etc.

In the exemplary aspect depicted in FIG. 1, the system 104 is an electric vehicle charger; however, the present disclosure is not limited to such an aspect. The system 104 may be any other device/apparatus/equipment that may be required to be transported from the source location 106 to the destination location 108, without departing from the present disclosure scope. Hereinafter, the system 104 is referred to as charger 104 in the present disclosure.

The source location 106 may be, for example, a warehouse, a manufacturing plant, a distributor/retailer store, and/or the like, from where the charger 104 may be required to be loaded into the vehicle 102 and transported to the destination location 108. The destination location 108 may be, for example, a customer home/office, a public or private charging station, and/or the like, from where a customer (not shown) may receive the charger 104 from the vehicle 102 and get the charger 104 installed. An example snapshot of the charger 104 in the installed state is depicted in a view 112 of FIG. 1. As shown in the view 112, any electric vehicle (e.g., a vehicle 114, which may be similar to or different from the vehicle 102) may get charged at the destination location 108 using the charger 104, when the charger 104 may be in the installed state.

A person ordinarily skilled in the art may appreciate that in some cases, the charger 104 may encounter an adverse situation at the source location 106 (e.g., during loading operation), during transit on the road network 110, e.g., when the charger 104 may be getting shipped from the source location 106 to the destination location 108 in the vehicle 102, and/or at the destination location 108 (e.g., during the pre-installation phase when the customer may have received the charger 104, but may not have yet installed the charger 104). The charger 104 may also encounter adverse situations after the charger 104 gets installed at the destination location 108. In some aspects, the adverse situation may result in the charger 104 getting dents or scratches, or one or more charger components may get broken when the charger 104 encounters an adverse situation.

Figure 2:
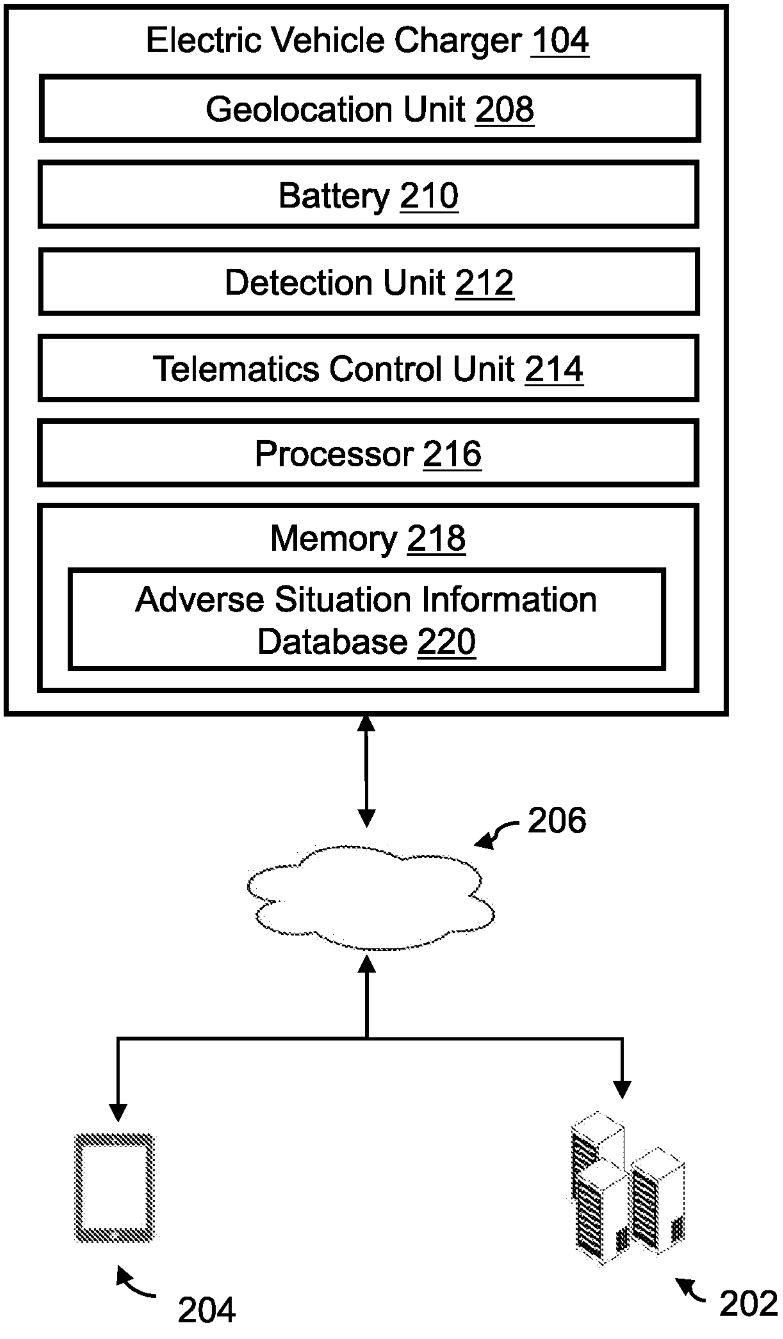
FIG. 2 depicts a block diagram of an electric vehicle charger in accordance with the present disclosure.

The charger 104 may be configured to determine when an adverse situation may be encountered by the charger 104, and store details associated with the adverse situation in a system memory (shown as memory 218 in FIG. 2) and/or transmit the details to a server (shown as server 202 in FIG. 2) and/or a user device (shown as user device 204 in FIG. 2). Specifically, the charger 104 may be configured to determine whether the charger 104 encounters the adverse situation during transit (or in a charger's "transit state") when the charger 104 may be getting shipped from the source location 106 to the destination location 108 via the vehicle 102, or in a charger's "pre-installation state" when the charger 104 may be delivered to the destination location 108 but not yet installed, or in a charger's "installed state" when the charger 104 may be installed at the destination location 108. The customer, a charger original equipment manufacturer (OEM)/manufacturer, a transport firm associated with the vehicle 102, an insurance firm, and/or the like, may access the server, the user device and/or the system memory to view the details associated with the adverse situation, and identify a potential reason for the adverse situation and/or a party responsible for the adverse situation (e.g., the customer, a vehicle operator associated with the vehicle 102, a warehouse operator, a user charging a vehicle at the destination location 108 using the charger 104, and/or the like). The process of determining the details associated with the adverse situation, and storing and/or transmitting the details, is described briefly below and in detail later in the description in conjunction with FIG. 2.

In some aspects, the charger 104 may include a detection unit (shown as detection unit 212 in FIG. 2) that may be configured to measure a level of nonconforming or unusual movement associated with the charger 104. In an exemplary aspect, the detection unit may be an accelerometer that may be configured to measure an amount of abrupt longitudinal and/or lateral movement associated with the charger 104, when the charger 104 may be in the transit state, the pre-installation state, or the installed state. The charger 104 may continuously or at a predefined frequency monitor the level of nonconforming movement measured by the detection unit, and may perform one or more predefined actions when the level of nonconforming movement exceeds a predefined threshold, based on the state of the charger 104.

Specifically, the charger 104 may first determine the charger state (from the three states described above, i.e., the transit state, the pre-installation state, or the installed state) in which the charger 104 may be in. In some aspects, the charge state may be set by a charger operator, an operator associated with the vehicle 102, a charger OEM/manufacturer, the customer, and/or the like. The charger 104 may also "auto-set" its own state based on a charger's geolocation, inputs received from one or more operators described above, and/or a supply of external power being fed to the charger 104 (e.g., when the charger 104 may be getting installed at the destination location 108).

Responsive to determining the charger state, the charger 104 may identify an optimal/appropriate or "permissible" threshold of nonconforming movement (or an "optimal movement threshold") that may be deemed as normal or usual for the charger 104, based on the charger state. As an example, the optimal movement threshold may have a higher value when the charger 104 may be in the transit state (and, e.g., when the road network 110 may be bumpy), and may have a lower value when the charger 104 may be in the installed state.

Responsive to identifying the optimal movement threshold, the charger 104 may compare the level of nonconforming movement measured by the detection unit with the identified optimal movement threshold, and perform a predefined action when the measured level of nonconforming movement exceeds the optimal movement threshold. In some aspects, the measured level of nonconforming movement exceeds the optimal movement threshold when, for example, the charger 104 encounters an adverse situation that may result in the charger 104 getting dents, scratches and/or the like, or result in one or more charger components getting broken. The predefined action performed by the charger 104 may be based on the charger state in which the charger 104 may be in.

As an example, when the charger 104 may be in the transit state and the measured level of nonconforming movement exceeds the optimal movement threshold for the transit state (e.g., a "first movement threshold"), the charger 104 may first cause a charger battery (shown as battery 210 in FIG. 2) to provide power to a charger's telematics control unit ("TCU", shown as TCU 214 in FIG. 2) and/or a geolocation unit (shown geolocation unit 208 in FIG. 2). Stated another way, the charger 104 may cause the TCU and/or the geolocation unit to "wake-up" (by powering them using the charger's battery power), when the measured level of nonconforming movement exceeds the first movement threshold in the system's transit state. In some aspects, the geolocation unit may determine a real-time system location when the geolocation unit is powered, and the TCU may be configured to transmit signals/data to external systems when the TCU is powered.

Responsive to powering the TCU and/or the geolocation unit, the charger 104 may cause the TCU to transmit details associated with the "event" or the "adverse situation" that may have caused the measured level of nonconforming movement to exceed the optimal movement threshold to the server and/or the user device. In an exemplary aspect, the details may include a system geolocation when the adverse situation may have occurred (as determined by the geolocation unit), information associated with date and time when the adverse situation may have occurred, the level of nonconforming movement measured by the detection unit when the adverse situation may have occurred, and/or the like. In additional or alternative aspects, the charger 104 may store the details described above in the system memory.

An operator associated with the charger OEM/manufacturer, the transport firm associated with the vehicle 102, and/or the like may access the server and/or the user device to view the details associated with the adverse situation to ascertain whether the charger 104 may have received dents, scratches, etc. due to the adverse situation and to determine a party responsible for the adverse situation. The customer receiving the charger 104 at the destination location 108 may also visually inspect the charger 104 to identify any potential dents, scratches, etc., and access the server and/or the user device to view a charger's "shipping log" or "transit log" and/or to determine a party responsible for the dents, scratches, etc. (if the customer identifies dents based on the visual inspection) based on the shipping log. The customer may also access/view the charger's shipping or transit log by accessing the system memory. In this manner, all the parties involved in charger manufacturing, loading/unloading, shipping, receiving, installing, etc., may transparently view the details associated with an adverse situation potentially encountered by the charger 104, and may accordingly identify a party responsible for the adverse situation. This may make the process of charger repair (if required), obtaining funds for the charge repair, claiming insurance, etc., easier and convenient for all the involved parties.

In some aspects, the customer may refuse to receive the charger 104 at the destination location 108 when the charger 104 may have encountered an adverse situation in the transit state (resulting in dents, scratches and/or broken charge components), or may receive the charger 104 at the destination location 108 when the charger 104 may be in an acceptable condition (i.e., when the charger 104 may not have encountered any adverse situation in the transit state, and/or may not have any dents, scratches and/or broken charger components).

In some aspects, when the charger 104 may be received at the destination location 108 by the customer, the customer and/or a vehicle operator may change the charger state from the transit state to the pre-installation state (or the charger 104 may itself change its state to the pre-installation state). Responsive to the charger state being changed to the pre-installation state, the charger 104 may identify the optimal movement threshold (e.g., a "second movement threshold") associated with the charger 104 in the pre-installation state. In some aspects, the second movement threshold may be different from the first movement threshold. In the pre-installation state as well, the charger 104 may monitor the level of nonconforming movement measured by the detection unit, and perform one or more predefined actions when the measured level of nonconforming movement exceeds the second movement threshold. For example, the charger 104 may power or "wake-up" the TCU and/or the geolocation unit, and transmit the details associated with the adverse situation (i.e., when the measured level of nonconforming movement exceeded the second movement threshold) to the server and/or the user device. The charger 104 may further store the details in the system memory. In this case as well, the operator associated with the charger OEM/manufacturer, the transport firm associated with the vehicle 102, and/or the like may access the server and/or the user device to view the details associated with the adverse situation, and determine whether the charger 104 may have encountered the adverse situation in the pre-installation state due to mishandling by the customer (and may accordingly plan future actions).

In further aspects, when the charger 104 may be powered at the destination location 108 and get installed, the customer and/or a charger operator may change the charger state to the installed state (or the charger 104 may itself change its state to the installed state). Responsive to the charger state being changed to the installed state, the charger 104 may identify the optimal movement threshold (e.g., a "third movement threshold") associated with the charger 104 in the installed state. In some aspects, the third movement threshold may be different from the first and second movement thresholds described above. Further, the third movement threshold may be adaptable or modifiable. Stated another way, the charger 104 may modify the third movement threshold based on a plurality of parameters such as ambient temperature and/or humidity level, a type of operation being performed using the charger 104, loads connected to the charger 104, and/or the like. In a similar manner, in some aspects, the first and second movement threshold may also be adaptable or modifiable, based on a plurality of parameters.

In the installed state as well, the charger 104 may monitor the level of nonconforming movement measured by the detection unit, and perform one or more predefined actions when the measured level of nonconforming movement exceeds the third movement threshold. Examples of the predefined actions performed by the charger 104 in the installed state, and further charger details are described in detail below in conjunction with FIG. 2.

The vehicle 102 and the charger 104 implement and/or perform operations, as described here in the present disclosure, in accordance with the owner manual and safety guidelines. In addition, any action taken by the operator/customer associated with the charger 104 based on the notifications provided by the charger 104 should comply with all the rules specific to the location and operation of the charger 104 (e.g., Federal, state, country, city, etc.). The notifications, as provided by the charger 104 should be treated as suggestions and only followed according to any rules specific to the location and operation of the charger 104.

FIG. 2 depicts a block diagram of the electric vehicle charger 104 (or charger 104) in accordance with the present disclosure. While describing FIG. 2, references will be made to FIGS. 3 and 4.

The charger 104 may be communicatively coupled with one or more servers 202 (or server 202) and a user device 204 via one or more networks 206 (or network 206). In some aspects, the server 202 may be associated with a charger OEM/manufacturer. In other aspects, the server 202 may be associated with a transport firm operating the vehicle 102. In yet another aspect, the server 202 may be associated with an insurance firm or a firm configured to repair the charger 104 and/or fund the charger's repair.

In some aspects, the user device 204 may be associated with the customer who may receive the charger 104 at the destination location 108. In other aspects, the user device 204 may be associated with an operator associated with the charger OEM/manufacturer, the vehicle 102, the transport firm operating the vehicle 102, the insurance firm, and/or the like. The user device 204 may be, for example, a mobile phone, a laptop, a computer, a tablet, a wearable device, or any other device with communication capabilities.

The network 206 illustrates an example communication infrastructure in which the connected devices discussed in various embodiments of this disclosure may communicate. The network 206 may be and/or include the Internet, a private network, public network or other configuration that operates using any one or more known communication protocols such as, for example, transmission control protocol/Internet protocol (TCP/IP), Bluetooth®, Bluetooth® Low Energy (BLE), Wi-Fi based on the Institute of Electrical and Electronics Engineers (IEEE) standard 802.11, ultra-wideband (UWB), and cellular technologies such as Time Division Multiple Access (TDMA), Code Division Multiple Access (CDMA), High-Speed Packet Access (HSPDA), Long-Term Evolution (LTE), Global System for Mobile Communications (GSM), and Fifth Generation (5G), to name a few examples.

The charger 104 may include a plurality of units including, but not limited to, a geolocation unit 208, a battery 210, a detection unit 212, a telematics control unit (TCU) 214, a processor 216 and a memory 218, communicatively coupled with each other. The geolocation unit 208 may be configured to determine/detect a real-time system geolocation or real-time charger geolocation, and the TCU 214 may be configured to transmit signals or data to one or more external devices or systems, e.g., the server 202, the user device 204, and/or the like. In some aspects, the geolocation unit 208 may be part of the TCU 214. In other aspects, the geolocation unit 208 may be separate from the TCU 214, as shown in FIG. 2.

The battery 210 may be configured to store and provide power/energy to the geolocation unit 208, the TCU 214 and/or other charger components when the charger 104 may not be connected with a utility power supply. In some aspects, the detection unit 212 may include an accelerometer, and may be configured to measure the level of nonconforming movement associated with the charger 104, when the charger 104 may be in any one of a plurality of charger installation states, i.e., the transit state, the pre-installation state or the installed state. Stated another way, the detection unit 212 may measure a level of abrupt charger movement (e.g., abrupt longitudinal or lateral charger movement) when the charger 104 may be in any one of the plurality of charger installation states.

The processor 216 may be disposed in communication with one or more memory devices disposed in communication with the respective computing systems (e.g., the memory 218 and/or one or more external databases not shown in FIG. 2). The processor 216 may utilize the memory 218 to store programs in code and/or to store data for performing aspects in accordance with the disclosure. The memory 218 may be a non-transitory computer-readable storage medium or memory storing a program code that enables the processor 216 to perform operations in accordance with the present disclosure. The memory 218 may include any one or a combination of volatile memory elements (e.g., dynamic random-access memory (DRAM), synchronous dynamic random-access memory (SDRAM), etc.) and may include any one or more nonvolatile memory elements (e.g., erasable programmable read-only memory (EPROM), flash memory, electronically erasable programmable read-only memory (EEPROM), programmable read-only memory (PROM), etc.).

The memory 218 may be configured to store charger details or charger information. In some aspects, the memory 218 may include an adverse situation information database 220 that may be configured to store details associated with the adverse situation(s) encountered by the charger 104 in the transit state, the pre-installation state, or the installed state. The details associated with the adverse situation are briefly described above in conjunction with FIG. 1, and described in detail later in the description below.

In operation, when the charger 104 may be loaded into the vehicle 102 and may be ready to be shipped from the source location 106 to the destination location 108, an operator associated with the vehicle 102 or the charger OEM/manufacturer may fully charge the battery 210, and set the charger state to the transit state. In additional or alternative aspects, the charger 104 may itself set its state to the transit state when the charger 104 may be getting shipped from the source location 106 to the destination location 108. When the charger state may be set to the transit state, the processor 216 may determine the charger state (i.e., the transit state), from the plurality of charger states (i.e., the transit state, the pre-installation state, and the installed state), and may accordingly identify an optimal movement threshold (from a plurality of movement thresholds associated with the plurality of charger states) for the charger 104 associated with the transit state. For example, in this case, since the charger 104 may be in the transit state, the processor 216 may identify the first movement threshold as the optimal movement threshold for the charger 104 (as described above in conjunction with FIG. 1), from the first, second and third movement thresholds.

Further, as the charger 104 may be getting shipped from the source location 106 to the destination location 108 via the vehicle 102 in the transit state, the processor 216 may continuously (or at a predefined frequency) obtain the level of nonconforming movement associated with the charger 104 from the detection unit 212. The processor 216 may further compare the level of nonconforming movement with the first movement threshold, and may perform one or more predefined actions when the processor 216 determines that the measured level of nonconforming movement may be greater than the first movement threshold. Stated another way, the processor 216 may perform one or more predefined actions when a level of abrupt charger movement may be greater than the first movement threshold. In some aspects, the level of nonconforming movement may be greater than the first movement threshold when, for example, the charger 104 may have encountered an adverse situation during the transit from the source location 106 to the destination location 108, which may potentially result in dents, scratches and/or charger component breakage.

Examples of the predefined actions performed by the processor 216 responsive to determining that the measured level of nonconforming movement may be greater than the first movement threshold are described below. The examples described below should not be construed as limiting, and the processor 216 may perform additional actions as well, without departing from the present disclosure scope.

In an exemplary aspect, responsive to determining that the measured level of nonconforming movement may be greater than the first movement threshold, the processor 216 may cause the battery 210 to provide power/energy to (or to "wake-up") the TCU 214 and the geolocation unit 208. When the geolocation unit 208 may be powered-up, the geolocation unit 208 may determine a real-time charger geolocation (or a "charger geolocation") when the level of nonconforming movement may have exceeded the first movement threshold. Stated another way, when the geolocation unit 208 may be powered-up, the geolocation unit 208 may determine the charger geolocation where the charger 104 may have encountered the adverse situation.

Further, when the TCU 214 may be powered-up, the processor 216 may cause the TCU 214 to transmit a first alert notification (or information/details associated with the adverse situation) to the server 202 and/or the user device 204, via the network 206. In some aspects, the first alert notification may include the charger geolocation when the level of nonconforming movement may have exceeded the first movement threshold or when the charger 104 may have encountered the adverse situation, information associated with date and time when the level of nonconforming movement may have exceeded the first movement threshold, and/or information associated with the level of nonconforming movement measured by the detection unit 212 when the charger 104 may have encountered the adverse situation.

Figure 3:
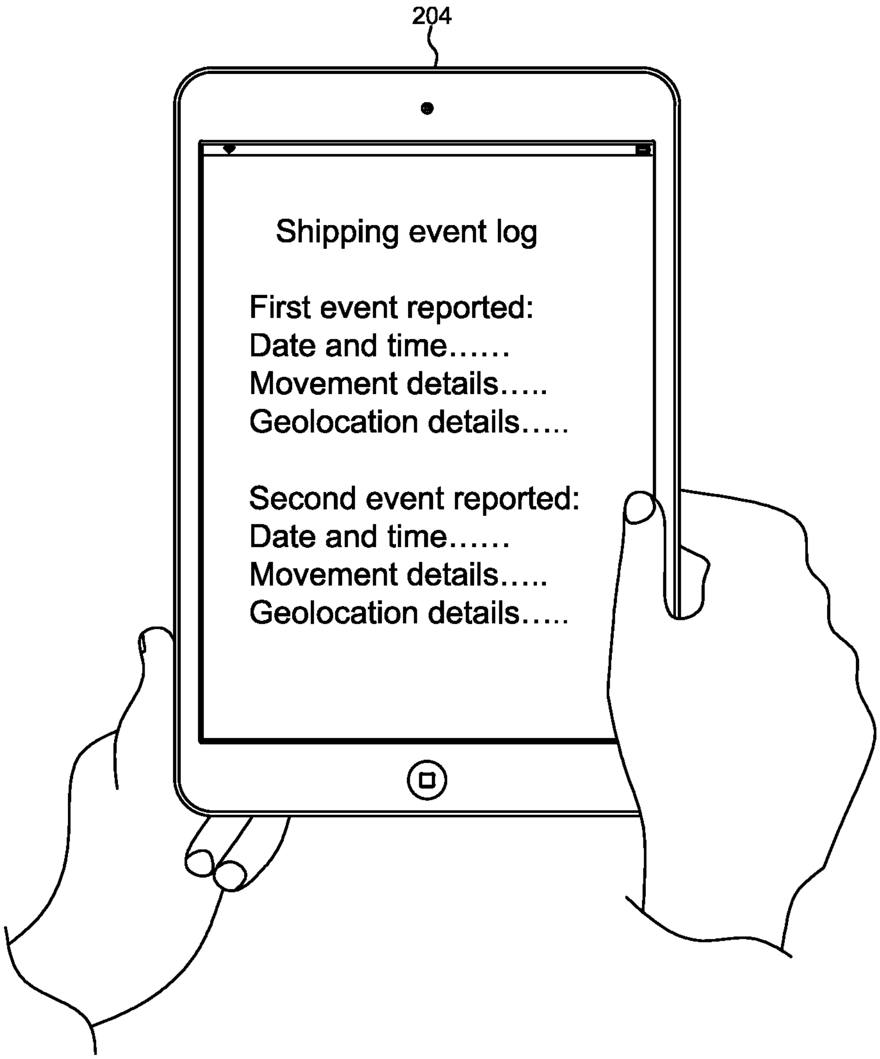
FIG. 3 depicts an example snapshot of a user interface displaying a shipping event log in accordance with the present disclosure.
Figure 4:
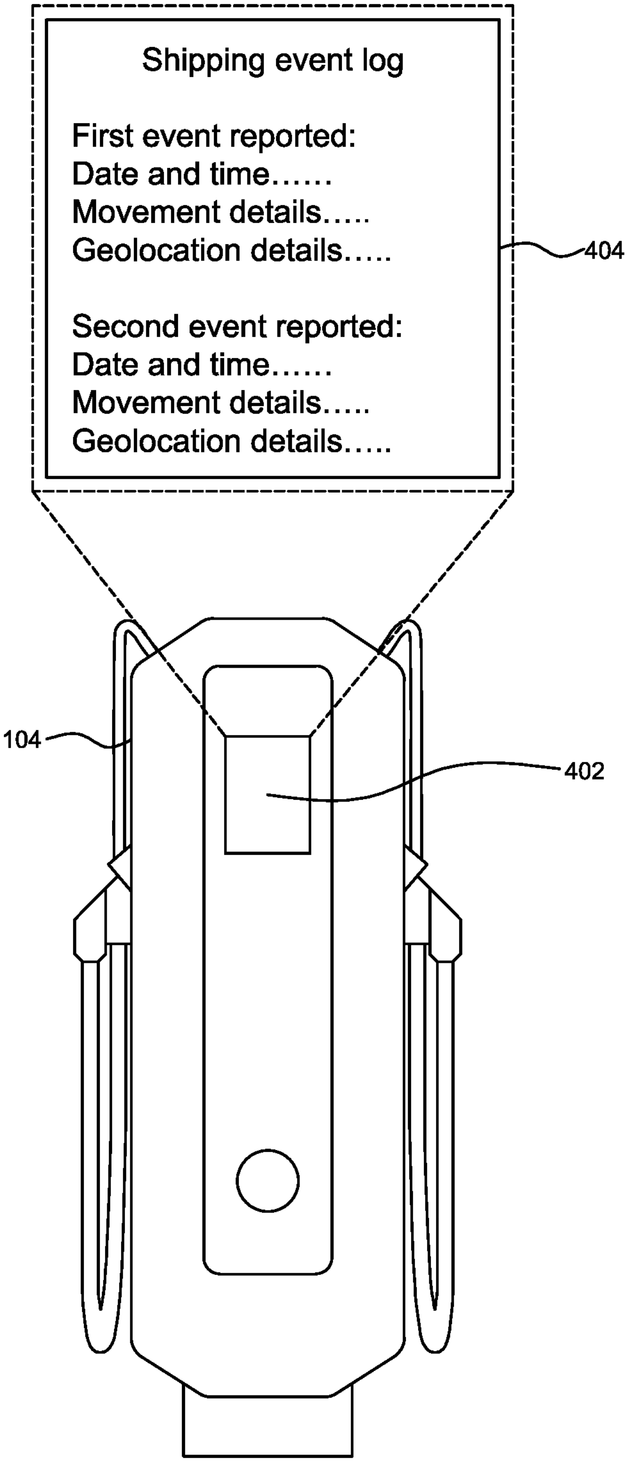
FIG. 4 depicts an example snapshot of an electric vehicle charger interface displaying a shipping event log in accordance with the present disclosure.

The operator associated with the server 202 and/or the user device 204 may view the first alert notification (and other similar alert notifications that may be transmitted by the TCU 214 when the charger 104 may be in the transit state), and may understand the potential reasons, location, and/or the responsible party for the charger adverse situation based on the first alert notification. An example view of a "shipping event log" or a log of a plurality of alert notifications (similar to the first alert notification described above) being displayed on the user device 204 is shown in FIG. 3. A person ordinarily skilled in the art may appreciate that such a shipping event log may enable the operator associated with the user device 204 to conveniently determine if a potential dent or scratch on the charger 104 and/or a broken charger component may have been caused by a user/driver operating the vehicle 102 and/or a transport firm personnel responsible for shipping the charger 104 from the source location 106 to the destination location 108.

In some aspects, when the battery 210 may not have enough power/energy to power-up or energize the TCU 214 when the charger 104 encounters an adverse situation in the transit state (i.e., when the level of nonconforming movement exceeds the first movement threshold), the processor 216 may cause the battery 210 to provide power only to the geolocation unit 208. In this case, instead of transmitting the details associated with the adverse situation to the server 202 and/or the user device 204 as described above, the processor 216 may store the details in the memory 218 (specifically the adverse situation information database 220). Stated another way, in this case, the processor 216 may store the charger geolocation when the level of nonconforming movement may have exceeded the first movement threshold or when the charger 104 may have encountered the adverse situation, information associated with date and time when the level of nonconforming movement may have exceeded the first movement threshold, and/or information associated with the level of nonconforming movement measured by the detection unit 212 when the charger 104 may have encountered the adverse situation, in the memory 218.

In additional or alternative aspects, the processor 216 may store the details associated with the adverse situation described above in the memory 218/adverse situation information database 220 even when the battery 210 may have enough power/energy to energize the TCU 214. In this case, the TCU 214 may transmit the details to the server 202 and/or the user device 204, and the processor 216 may, in parallel, store the details in the memory 218.

When the vehicle 102 reaches the destination location 108, the charger 104 may be unloaded from the vehicle 102. At this point, the customer at the destination location 108 may transmit, via a customer device (not shown), a shipping log request to the server 202. Responsive to receiving the shipping log request from the customer device, the server 202 may transmit a wake-up signal (e.g., a low-power radio message/signal) to the charger 104 to "wake-up" or "power-up".

The processor 216 may obtain the wake-up signal from the server 202, and may cause the battery 210 to provide power/energy to the TCU 214 and/or a charger user interface (shown as charger user interface 402 in FIG. 4) responsive to obtaining the wake-up signal. The processor 216 may further cause the TCU 214 to transmit the details associated with the adverse situation(s) encountered by the charger 104 during the transit state (that may be stored in the memory 218) to the server 202 and/or the user device 204, responsive to energizing the TCU 214. In additional or alternative aspects, the processor 216 may cause the charger user interface 402 to display the details associated with the adverse situation(s) encountered by the charger 104 during the transit state (that may be stored in the memory 218), responsive to energizing the charger user interface 402, as shown in a view 404 of FIG. 4.

The customer at the destination location 108 may view the details described above by accessing the server 202, and/or by viewing the details on the charger user interface 402. The customer may also visually inspect the charger 104. If the customer identifies any dents, scratches, etc., on the charger

104 due to the adverse situations potentially encountered by the charger 104 in the transit state, the customer may decide not to accept or receive the charger 104. In this case, the details associated with the adverse situations stored in the server 202 and/or the memory 218 may facilitate in determining a party (e.g., the operator associated with the vehicle 102 or the shipping firm) responsible for the charger dent, scratches, etc., and may accordingly fund the charger repair (or assist in insurance claim).

On the other hand, when the charger 104 may be in an acceptable condition, the customer at the destination location 108 may accept/receive the charger 104. At this point, the customer or an operator associated with the charger 104/vehicle 102 may set the charger state to the pre-installation state. In alternative aspects, at this point, the charger 104 may itself set its state to the pre-installation state.

When the charger state changes to the pre-installation state, the processor 216 may determine an optimal movement threshold (e.g., the second movement threshold) associated with the pre-installation state. In some aspects, the second movement threshold may be different from the first movement threshold. In other aspects, the second movement threshold may be same as the first movement threshold.

In the pre-installation state also, similar to the transit state, the processor 216 may continuously (or at a predefined frequency) obtain the level of nonconforming movement associated with the charger 104 from the detection unit 212. The processor 216 may further compare the level of nonconforming movement with the second movement threshold, and may perform one or more predefined actions when the processor 216 determines that the measured level of nonconforming movement may be greater than the second movement threshold. For example, in this case, responsive to determining that the level of nonconforming movement may be greater than the second movement threshold, the processor 216 may cause the battery 210 to provide power to the TCU 214 and the geolocation unit 208, and cause the TCU 214 to transmit a second alert notification to the server 202 and/or the user device 204 when the TCU 214 wakes up or gets powered. The second alert notification (or details/information associated with the adverse situation when the charger state may be the pre-installation state) may be similar to the first alert notification, and may include, for example, the charger geolocation when the level of nonconforming movement may have exceeded the second movement threshold or when the charger 104 may have encountered the adverse situation, information associated with date and time when the level of nonconforming movement may have exceeded the second movement threshold, and/or information associated with the level of nonconforming movement measured by the detection unit 212 when the charger 104 may have encountered the adverse situation.

The second alert notification may facilitate an operator associated with the server 202 and/or the user device 204 to determine whether the customer at the destination location 108 may have mishandled the charger 104 and caused dents, scratches, etc. to the charger 104.

When no adverse situation may be encountered by the charger 104 during the pre-installation state, the customer or the charger operator may plug the charger 104 to a utility power source, thereby installing the charger 104 at the destination location 108. At this point, the customer or the charger operator may change the charger state to the installed state, or the charger 104 may itself change its state to the installed state when the charger 104 may be plugged in. In some aspects, the charger components/units may get energized or draw power from the utility power source, when the charger 104 may be in the installed state.

When the charger state may be changed to the installed state, the processor 216 may cause the TCU 214 to transmit the information stored in the memory 218/adverse situation information database 220 to the server 202 and/or the user device 204 for record-keeping purpose. Stated another way, when the charger state may be changed to the installed state, the processor 216 may cause the TCU 214 to transmit the details associated with the adverse situation (if any) encountered by the charger 104 during the transit state and the pre-installation state to the server 202 and/or the user device 204 for record-keeping purpose.

Further, when the charger state may be the installed state, the processor 216 may cause the TCU 214 to transmit the real-time charger geolocation detected by the geolocation unit 208, time and date information/timestamp, and information associated with the level of nonconforming movements measured by the detection unit 212 to the server 202 and/or the user device 204 at a predefined frequency or a regular cadence, for record-keeping purpose.

In further aspects, when the charger state may be the installed state, the processor 216 may continuously (or at a predefined frequency) monitor a power supply from the utility power source to the charger 104. In an exemplary aspect, the processor 216 may perform one or more predefined actions when the processor 216 determines that the power supply to the charger 104 may be interrupted in the installed state. As an example, when the power supply to the charger 104 may be interrupted, the processor 216 may cause the battery 210 to provide power to the TCU 214. Responsive to powering-up the TCU 214, the processor 216 may cause the TCU 214 to transmit a power outage notification to the server 202 and/or the user device 204, so that the operator/customer associated with the server 202/user device 204 may know that the power supply to the charger 104 may have been interrupted.

As another example, when the power supply to the charger 104 may be interrupted, the processor 216 may cause the battery 210 to provide power to the TCU 214 and the geolocation unit 208. The processor 216 may further determine an optimal movement threshold (e.g., the third movement threshold) associated with the installed state, and determine if the level of nonconforming movement measured by the detection unit 212 exceeds the third movement threshold. In some aspects, the level of nonconforming movement may exceed the third movement threshold when the charger 104 encounters an adverse situation in the installed state. In an exemplary aspect, the third movement threshold may be different from the first and second movement thresholds described above.

Responsive to determining that the level of nonconforming movement may have exceeded the third movement threshold, the processor 216 may cause the TCU 214 to transmit the charger geolocation when the level of nonconforming movement may have exceeded the third movement threshold, time and date information when the level of nonconforming movement may have exceeded the third movement threshold, information associated with the level of nonconforming movement, and/or the like, to the server 202 and/or the user device 204. In additional aspects, in this case, the processor 216 may cause the TCU 214 to transmit information associated with a type of vehicle/load (e.g., the vehicle 114) that may have been connected to the charger 104 before or after the event (i.e., the adverse situation) that may have caused the level of nonconforming movement to exceed the third movement threshold. Such an information may assist an operator associated with the server 202 and/or the user device 204 to determine a party that may be responsible for the adverse situation associated with the charger 104 in the installed state.

In some aspects, the step of comparing the level of nonconforming movement with the third movement threshold, and performing the predefined action when the nonconforming movement exceeds the third movement threshold (as described above) may also be performed by the processor 216 when the power supply to the charger 104 may not be interrupted. Stated another way, in some aspects, the processor 216 may execute the steps of comparing and performing the predefined action irrespective of whether the power supply to the charger 104 is interrupted or not interrupted.

In some aspects, the first, second and third movement thresholds described above may be adjustable or modifiable by the processor 216 based on a plurality of parameters. For example, the processor 216 may adjust the first movement threshold based on a charger type, a type of packaging disposed on the charger 104 before the charger 104 may be loaded onto the vehicle 102, type of roads (e.g., smooth, bumpy, etc.) on the road network 110, a level of energy stored in the battery 210, and/or the like. Similarly, the processor 216 may adjust the second and third movement thresholds based on an ambient temperature level, an ambient humidity level, the destination location 108 or the charger geolocation, the battery energy level, and/or the like. As an example, the second and/or the third movement threshold may have a higher value when the ambient humidity level may be high. In some aspects, the processor 216 may determine the ambient humidity level via the charger user interface 402. In other aspects, the processor 216 may determine the ambient humidity level and/or the temperature level based on inputs obtained from the server 202.

In further aspects, the processor 216 may adjust the third movement threshold based on a step in an electric vehicle (EV) charging process being performed using the charger 104, charger loads or loads being attached to the charger 104, a level of charger wear and tear over time (e.g., wear and tear due to the charger connector getting plugged/unplugged multiple times with frequent use), user inputs, time and date information, and/or the like. A person ordinarily skilled in the art may appreciate that there are known shock levels or nonconforming movements for steps/items associated with an EV charging process, such as plugging/unplugging a charging cord/connector, interacting with the charger user interface 402, and/or the like. The processor 216 uses such known shock levels to calibrate or adjust the third movement threshold, when the charger 104 may be in the installed state. As an example, cutting a charging cable off may require a certain level of force that may not be consistent with normal operational measurements/known shock levels. In this case, the processor 216 may identify such instances as "adverse situations" associated with the charger 104, and may perform one or more predefined actions described above responsive to identifying such instances. Parties/users responsible for such instances (e.g., theft, vandalism, improper use, etc.) may be alerted and/or not allowed to use the charger 104 in the future. Similarly, depending on the step in the EV charging process (removing cord, plugging back in, etc.) being performed on the charger 104, the processor 216 may accordingly compare the level of shock/nonconforming movements with the third movement threshold, to report any potential adverse situation associated with the charger 104. In some aspects, the customer may also calibrate the detection unit 212/accelerometer via recorded normal operation repetitive events, and verify that accelerometer operations are working fine over time.

A person ordinarily skilled in the art may appreciate from the description above that the charger 104 facilitates in determining a potential reason for the charger fault or dent, during different states of charger installation/operation, e.g., the transit state, the pre-installation state, the installed state, a repair state, and/or the like. Further, different levels or types of adverse situations have different signatures of nonconforming charger movements or shock levels measured by the detection unit 212/accelerometer. An operator associated with the server 202 and/or the user device 204 may determine a potential type of adverse situation encountered by the charger 104 by reviewing the corresponding (signature of) nonconforming charger movement or shock level measured by the detection unit 212/accelerometer. This may further assist the operator to identify a potential reason for the adverse situation, and plan remedial actions to prevent similar adverse situations in the future.

Figure 5:
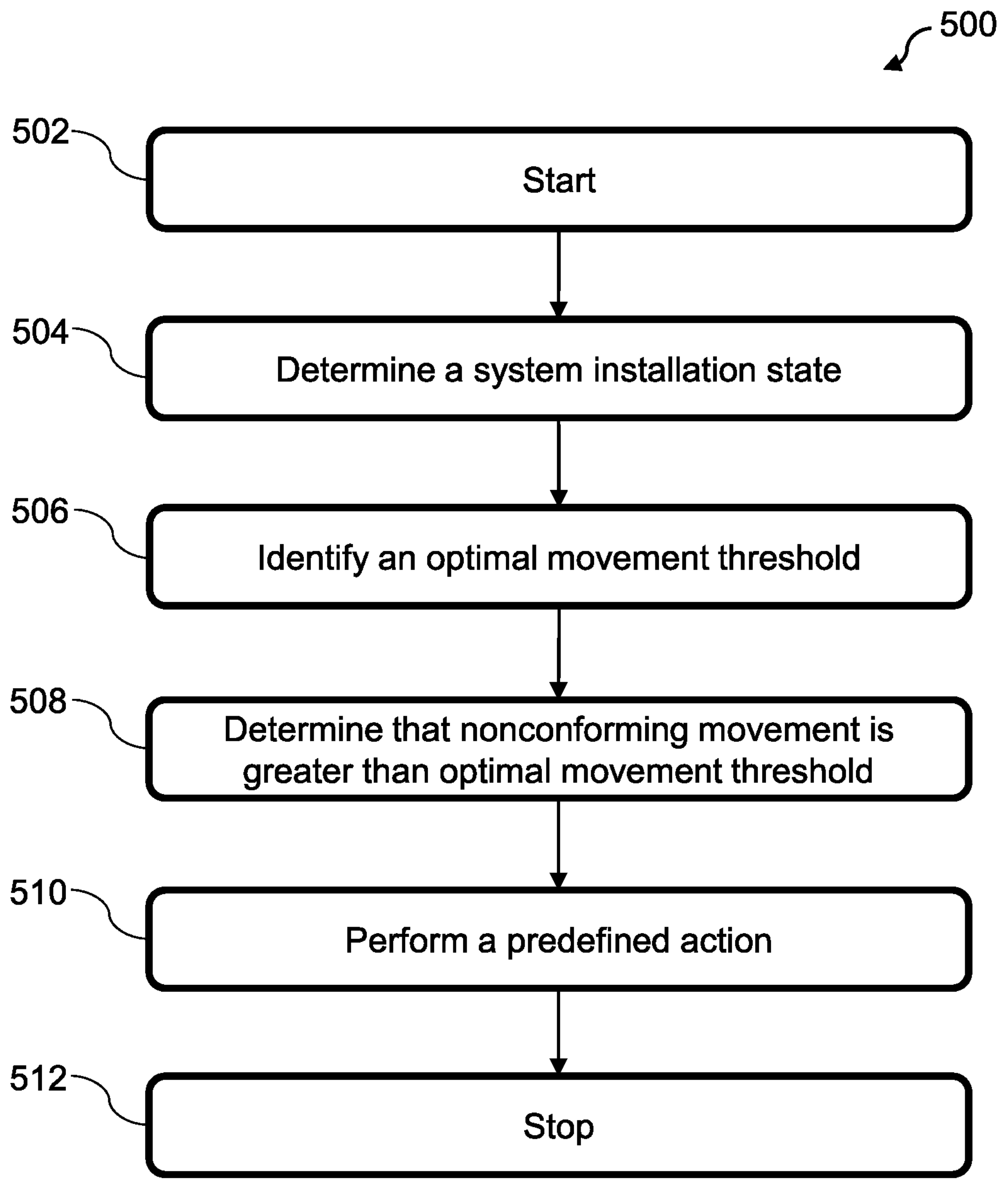
FIG. 5 depicts a flow diagram of an example method for monitoring an electric vehicle charger in accordance with the present disclosure.

FIG. 5 depicts a flow diagram of an example method 500 for monitoring the electric vehicle charger 104 in accordance with the present disclosure. FIG. 5 may be described with continued reference to prior figures. The following process is exemplary and not confined to the steps described hereafter. Moreover, alternative embodiments may include more or less steps than are shown or described herein and may include these steps in a different order than the order described in the following example embodiments.

The method 500 starts at step 502. At step 504, the method 500 may include determining, by the processor 216, the charger state (or a system installation state) in which the charger 104 may be in (from the transit state, the pre-installation state, and the installed state). At step 506, the method 500 may include identifying, by the processor 216, an optimal movement threshold, from the first, second and third movement thresholds, based on the determined charger state.

At step 508, the method 500 may include determining, by the processor 216, that the level of nonconforming movement associated with the charger 104 measured by the detection unit 212 may be greater than the identified optimal movement threshold. At step 510, the method 500 may include performing, by the processor 216, a predefined action responsive to determining that the level of nonconforming movement may be greater than the optimal movement threshold. The examples of the predefined action(s) performed by the processor 216 are described above in conjunction with FIG. 2.

At step 512, the method 500 may stop.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A system comprising:

a detection unit configured to measure a level of nonconforming movement associated with the system; and a processor communicatively coupled with the detection unit, wherein the processor is configured to:

determine a system installation state from a plurality of system installation states, wherein the plurality of system installation states comprises a transit state, a pre-installation state, and an installed state;

identify an optimal movement threshold, from a plurality of movement thresholds associated with the plurality of system installation states, based on the system installation state;

determine that the level of nonconforming movement is greater than the optimal movement threshold; and perform a predefined action responsive to determining that the level of nonconforming movement is greater than the optimal movement threshold.

2. The system of claim 1, wherein the system is an electric vehicle charger.

3. The system of claim 1, wherein the detection unit is an accelerometer.

4. The system of claim 1 further comprising:

a geolocation unit configured to detect a real-time system geolocation;

a telematics control unit configured to transmit signals or data to one or more external devices;

a memory configured to store system information; and a battery configured to store and provide power to the telematics control unit and the geolocation unit.

5. The system of claim 4, wherein the optimal movement threshold is a first movement threshold when the system installation state is the transit state, a second movement threshold when the system installation state is the pre-installation state, and a third movement threshold when the system installation state is the installed state.

6. The system of claim 5, wherein the optimal movement threshold is a first movement threshold when the system installation state is the transit state, and wherein the predefined action comprises:

causing the battery to provide power to the telematics control unit and the geolocation unit when the level of nonconforming movement is greater than the first movement threshold; and causing the telematics control unit to transmit a first alert notification to a server or a user device, wherein the first alert notification comprises one or more of a system geolocation when the level of nonconforming movement exceeded the first movement threshold, time and date information when the level of nonconforming movement exceeded the first movement threshold, and information associated with the level of nonconforming movement.

7. The system of claim 5, wherein the optimal movement threshold is a first movement threshold when the system installation state is the transit state, and wherein the predefined action comprises:

causing the battery to provide power to the geolocation unit when the level of nonconforming movement is greater than the first movement threshold; and storing one or more of a system geolocation when the level of nonconforming movement exceeded the first movement threshold, time and date information when the level of nonconforming movement exceeded the first movement threshold, and information associated with the level of nonconforming movement, in the memory.

8. The system of claim 7, wherein the processor is further configured to:

obtain a wake-up signal from a server;

cause the battery to provide power to at least one of the telematics control unit or a system user interface, responsive to obtaining the wake-up signal; and cause the telematics control unit to transmit information stored in the memory to a user device or the system user interface to display the information stored in the memory, wherein the information stored in the memory comprises one or more of the system geolocation, the time and date information, and the information associated with the level of nonconforming movement.

9. The system of claim 8, wherein the processor is further configured to cause the telematics control unit to transmit the information stored in the memory to the server, when the system installation state changes to the installed state.

10. The system of claim 5, wherein the optimal movement threshold is a second movement threshold when the system installation state is the pre-installation state, and wherein the predefined action comprises:

causing the battery to provide power to the telematics control unit and the geolocation unit, when the level of nonconforming movement is greater than the second movement threshold; and causing the telematics control unit to transmit a second alert notification to a server or a user device, wherein the second alert notification comprises one or more of a system geolocation when the level of nonconforming movement exceeded the second movement threshold, time and date information when the level of nonconforming movement exceeded the second movement threshold, and information associated with the level of nonconforming movement.

11. The system of claim 5, wherein the optimal movement threshold is a third movement threshold when the system installation state is the installed state.

12. The system of claim 11, wherein the processor is further configured to cause the telematics control unit to transmit one or more of the real-time system geolocation detected by the geolocation unit, time and date information, and information associated with the level of nonconforming movement measured by the detection unit to a server at a predefined frequency, when the system installation state is the installed state.

13. The system of claim 11, wherein the processor is further configured to:

determine that a power supply to the system is interrupted when the system installation state is the installed state; and perform the predefined action responsive to determining that the power supply to the system is interrupted.

14. The system of claim 13, wherein the predefined action comprises:

causing the battery to provide power to the telematics control unit and the geolocation unit; and causing the telematics control unit to transmit one or more of a system geolocation when the level of nonconforming movement exceeded the third movement threshold, time and date information when the level of nonconforming movement exceeded the third movement threshold, information associated with the level of nonconforming movement, and a type of vehicle being connected to the system before or after an event when the level of nonconforming movement exceeded the third movement threshold.

15. The system of claim 13, wherein the processor is further configured to:

cause the battery to provide power to the telematics control unit responsive to determining that the power supply to the system is interrupted; and cause the telematics control unit to transmit a power outage notification to a server.

16. The system of claim 11, wherein the processor is further configured to modify the third movement threshold based on at least one of: a step in an electric vehicle charging process being performed using the system, system loads, an ambient temperature level, an ambient humidity level, a level of system wear and tear over time, user inputs, a system geolocation, and time and date information.

17. A method comprising:

determining, by a processor, a system installation state from a plurality of system installation states associated with a system, wherein the plurality of system installation states comprises a transit state, a pre-installation state, and an installed state;

identifying, by the processor, an optimal movement threshold, from a plurality of movement thresholds associated with the plurality of system installation states, based on the system installation state;

determining, by the processor, that a level of nonconforming movement associated with the system measured by a detection unit is greater than the optimal movement threshold; and performing, by the processor, a predefined action responsive to determining that the level of nonconforming movement is greater than the optimal movement threshold.

18. The method of claim 17, wherein the system is an electric vehicle charger.

19. The method of claim 17, wherein the detection unit is an accelerometer.

20. A non-transitory computer-readable storage medium having instructions stored thereupon which, when executed by a processor, cause the processor to:

determine a system installation state from a plurality of system installation states associated with a system, wherein the plurality of system installation states comprises a transit state, a pre-installation state, and an installed state;

identify an optimal movement threshold, from a plurality of movement thresholds associated with the plurality of system installation states, based on the system installation state;

determine that a level of nonconforming movement associated with the system measured by a detection unit is greater than the optimal movement threshold; and perform a predefined action responsive to determining that the level of nonconforming movement is greater than the optimal movement threshold.

* * * * *